US012557737B2

(12) United States Patent
De Jager et al.

(10) Patent No.: US 12,557,737 B2
(45) Date of Patent: Feb. 24, 2026

(54) SYSTEM AND APPARATUS FOR PROVIDING DRIVER PACING INFORMATION FOR AGRICULTURAL VEHICLES

(71) Applicants: Thad De Jager, Rock Valley, IA (US); Nolan Den Boer, Rock Valley, IA (US); Collin Borkowski, Rock Valley, IA (US); Nicholas Vande Waerdt, Rock Valley, IA (US); Grant Post, Rock Valley, IA (US); Steven Fluit, Hull, IA (US)

(72) Inventors: Thad De Jager, Rock Valley, IA (US); Nolan Den Boer, Rock Valley, IA (US); Collin Borkowski, Rock Valley, IA (US); Nicholas Vande Waerdt, Rock Valley, IA (US); Grant Post, Rock Valley, IA (US); Steven Fluit, Hull, IA (US)

(73) Assignee: Kooima Ag, Inc., Rock Valley, IA (US)

( * ) Notice: Subject to any disclaimer, the term of this patent is extended or adjusted under 35 U.S.C. 154(b) by 511 days.

(21) Appl. No.: 18/165,002

(22) Filed: Feb. 6, 2023

(65) Prior Publication Data

US 2023/0247942 A1      Aug. 10, 2023

Related U.S. Application Data

(60) Provisional application No. 63/308,223, filed on Feb. 9, 2022.

(51) Int. Cl.
*A01D 75/00* (2006.01)
*A01D 90/10* (2006.01)

(52) U.S. Cl.
CPC ............. *A01D 75/00* (2013.01); *A01D 90/10* (2013.01)

(58) Field of Classification Search
CPC ...... A01D 75/00; A01D 90/10; A01D 43/087; A01D 43/073; A01D 41/1275;
(Continued)

(56) References Cited

U.S. PATENT DOCUMENTS

| | | | |
|---|---|---|---|
| 4,612,996 A | 9/1986 | Wolf | |
| 11,659,788 B2 * | 5/2023 | Puryk | A01D 41/127 414/467 |

(Continued)

OTHER PUBLICATIONS

PCT/US2023/012484, International Search Report, Kooima Ag, Inc., 2 pages, May 26, 2023.
(Continued)

*Primary Examiner* — Anne Marie Antonucci
(74) *Attorney, Agent, or Firm* — Jeffrey A. Proehl; Woods, Fuller, Shultz & Smith, PC

(57) ABSTRACT

A driver pacing information apparatus for providing a driver of transport vehicle with pacing information for operating the transport vehicle alongside a harvester may include a position sensing assembly configured to sense a position of a transfer spout of the harvester with respect to a frame of the harvester, a pacing indication display configured to provide pacing information to the driver of the transport vehicle, and a controller assembly configured to control the pacing indication display based upon position sensing of the position sensing assembly. The pacing indication display may be configured to visually provide pacing information to the driver of the transport vehicle.

17 Claims, 14 Drawing Sheets

(58) Field of Classification Search
CPC ........ A01D 43/06; A01D 43/07; B65G 67/22; B65G 67/24; B60P 1/42; B60R 11/04; B62D 6/001; B65B 1/48; G05D 1/021; G05D 1/0246; G05D 1/0251; G05D 1/0293; G05D 1/02; G06F 18/22; G06F 7/70; G06T 7/13; G06T 7/20; G06T 7/593; G06T 7/62; G06T 7/70; G06T 2207/10021; G06T 2207/10028; G06T 2207/20061; G06T 2207/20228; G06T 2207/30252; H04N 7/18; H04N 7/181; H04N 7/183; H04N 13/128; B65F 2210/182; B65F 9/00; A01B 69/00; G16Z 99/00
See application file for complete search history.

(56) References Cited

U.S. PATENT DOCUMENTS

| | | | |
|---|---|---|---|
| 2002/0082757 | A1 | 6/2002 | Behnke |
| 2005/0279070 | A1 | 12/2005 | Pirro |
| 2011/0186692 | A1 | 8/2011 | Kumar |
| 2012/0263560 | A1 | 10/2012 | Diekhans |
| 2022/0304231 | A1* | 9/2022 | Faust ................... G05D 1/0016 |

OTHER PUBLICATIONS

PCT/US2023/012484, Written Opinion of the International Searching Authority, Kooima Ag, Inc., 5 pages, May 26, 2023.

* cited by examiner

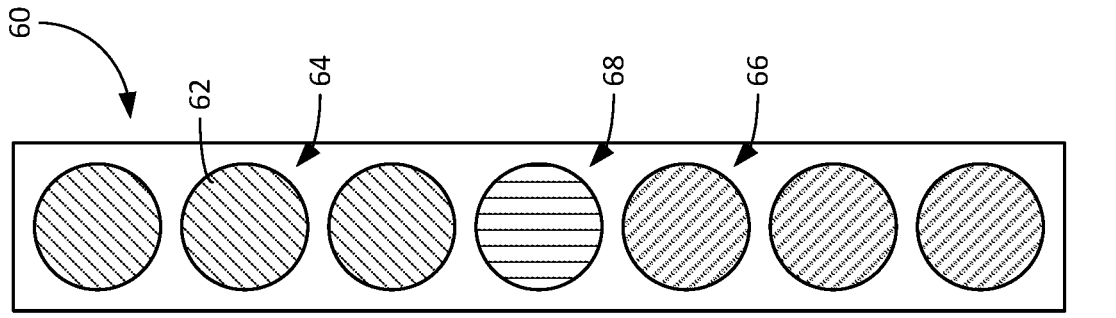
FIG. 6D
FIG. 6C
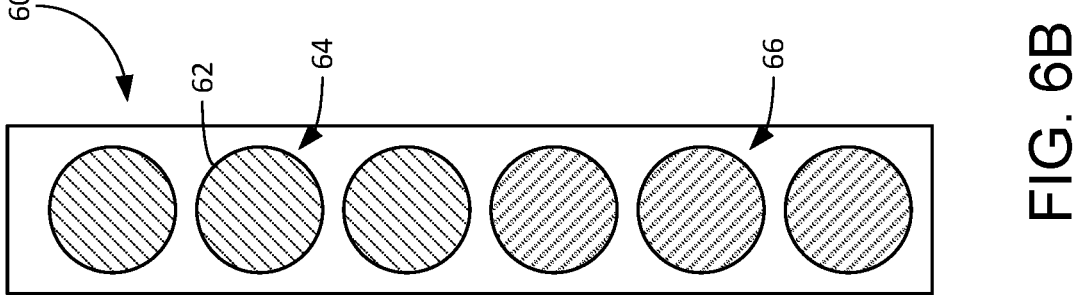
FIG. 6B
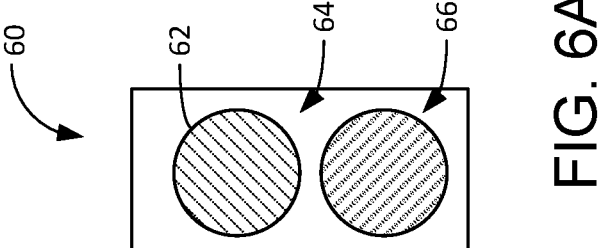
FIG. 6A

SYSTEM AND APPARATUS FOR PROVIDING DRIVER PACING INFORMATION FOR AGRICULTURAL VEHICLES

REFERENCE TO RELATED PATENT APPLICATIONS

This application claims the priority of U.S. Provisional Patent Application No. 63/308,223, filed Feb. 9, 2022, which is hereby incorporated by reference in its entirety.

BACKGROUND

Field

The present disclosure relates to apparatus for harvesting operations and more particularly pertains to a new system and apparatus for providing driver pacing information for agricultural vehicles for facilitating efficient movement of a vehicle collecting crop materials in coordination with a harvester of the crop materials.

SUMMARY

In one aspect, the present disclosure relates to a system which comprises a mobile machine configured to move across a ground surface and gather a material from a location adjacent to the ground surface and dispense the material from a dispensing structure of the machine at a raised location with respect to the ground surface, with the dispensing structure being movable to change a trajectory of material exiting the dispensing structure. The system may further comprise a driver pacing information apparatus configured to provide a driver of a transport vehicle with pacing information for operating the transport vehicle alongside the mobile machine.

In another aspect, the disclosure relates to a driver pacing information apparatus for providing a driver of transport vehicle with pacing information for operating the transport vehicle alongside a mobile machine. The pacing information apparatus may comprise a position sensing assembly configured to sense a position of a transfer spout of the mobile machine with respect to a frame of the mobile machine. The apparatus may also comprise a pacing indication display configured to provide pacing information to the driver of the transport vehicle. The apparatus may further comprise a controller assembly configured to control the pacing indication display based upon position sensing of the position sensing assembly.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components, and the particulars of the steps, set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein:

FIG. 6A is a schematic diagram of an illustrative configuration of the light sources of the pacing indication display of the pacing information apparatus, according to an illustrative embodiment.

FIG. 6B is a schematic diagram of another illustrative configuration of the light sources of the pacing indication display of the pacing information apparatus, according to an illustrative embodiment.

FIG. 6C is a schematic diagram of yet another illustrative configuration of the light sources of the pacing indication display of the pacing information apparatus, according to an illustrative embodiment.

FIG. 6D is a schematic diagram of still another illustrative configuration of the light sources of the pacing indication display of the pacing information apparatus, according to an illustrative embodiment.

DETAILED DESCRIPTION

Figure 1:
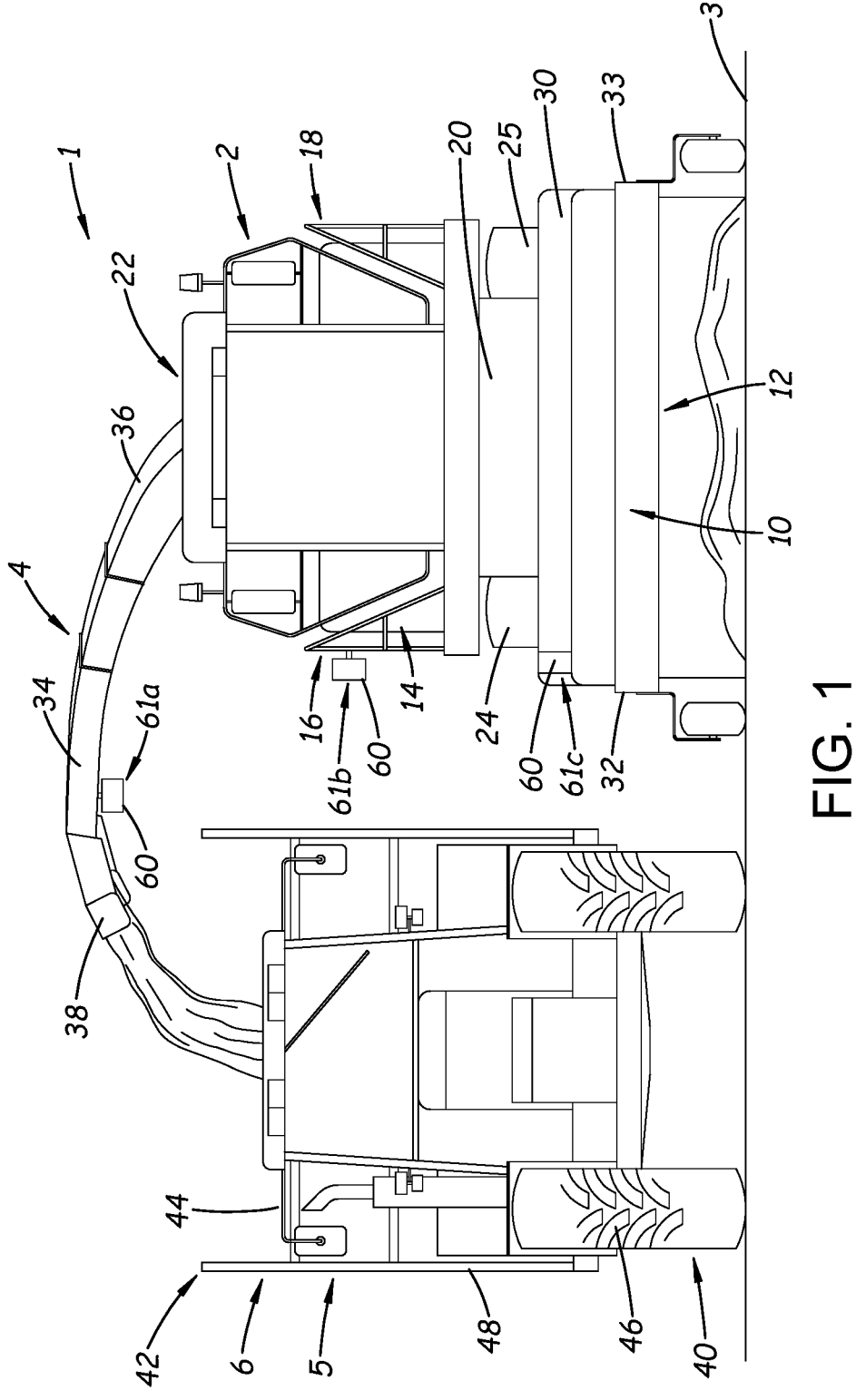
FIG. 1 is a schematic perspective view of a new system and apparatus for providing driver pacing information for agricultural vehicles according to the present disclosure.
Figure 2A:
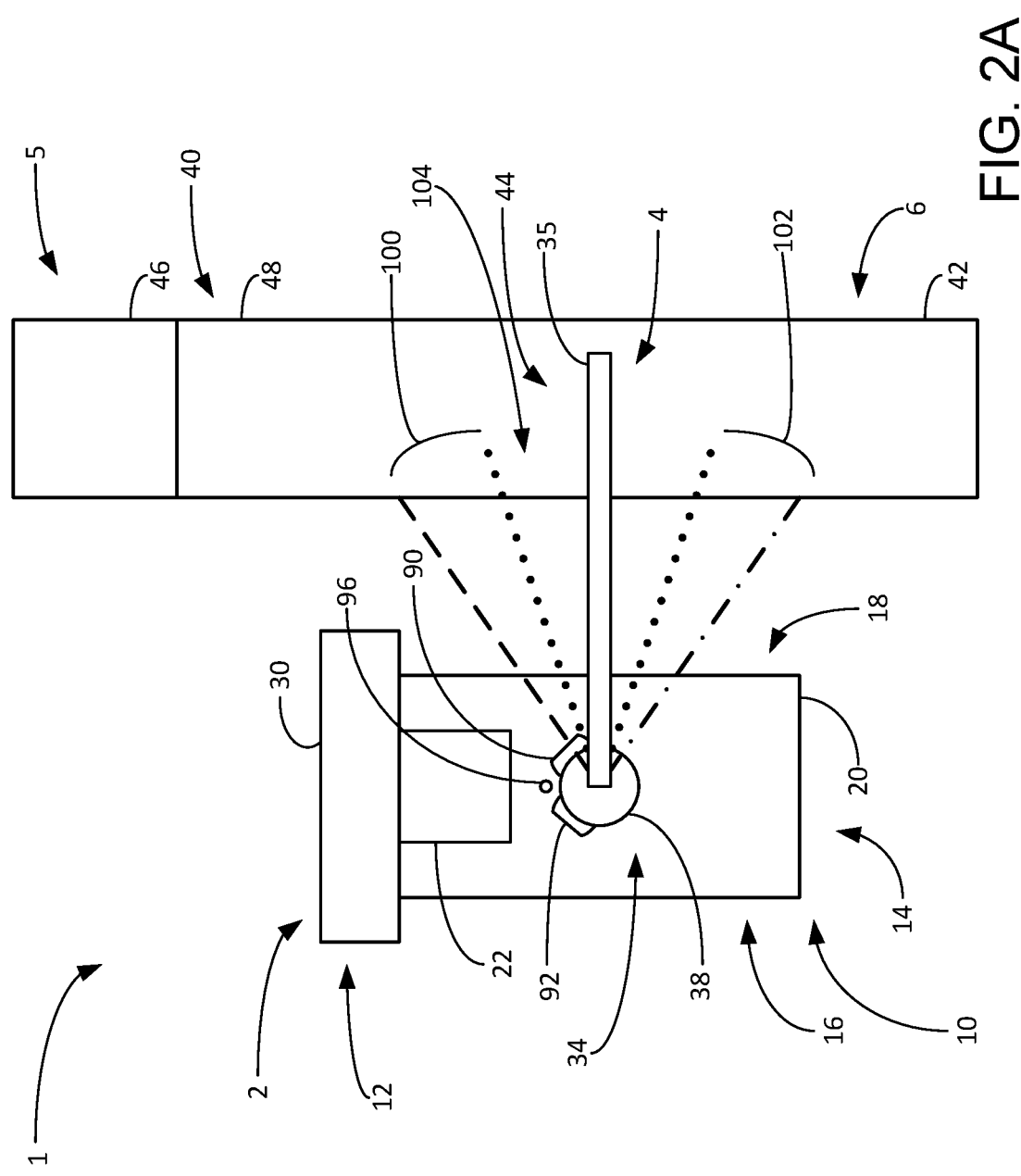
FIG. 2A is a schematic overhead diagram of elements of the system, such as a harvester and transport vehicle and elements of the pacing information apparatus, with the transfer spout being shown with a rotational orientation in a third range of angular values, according to an illustrative embodiment.
Figure 2B:
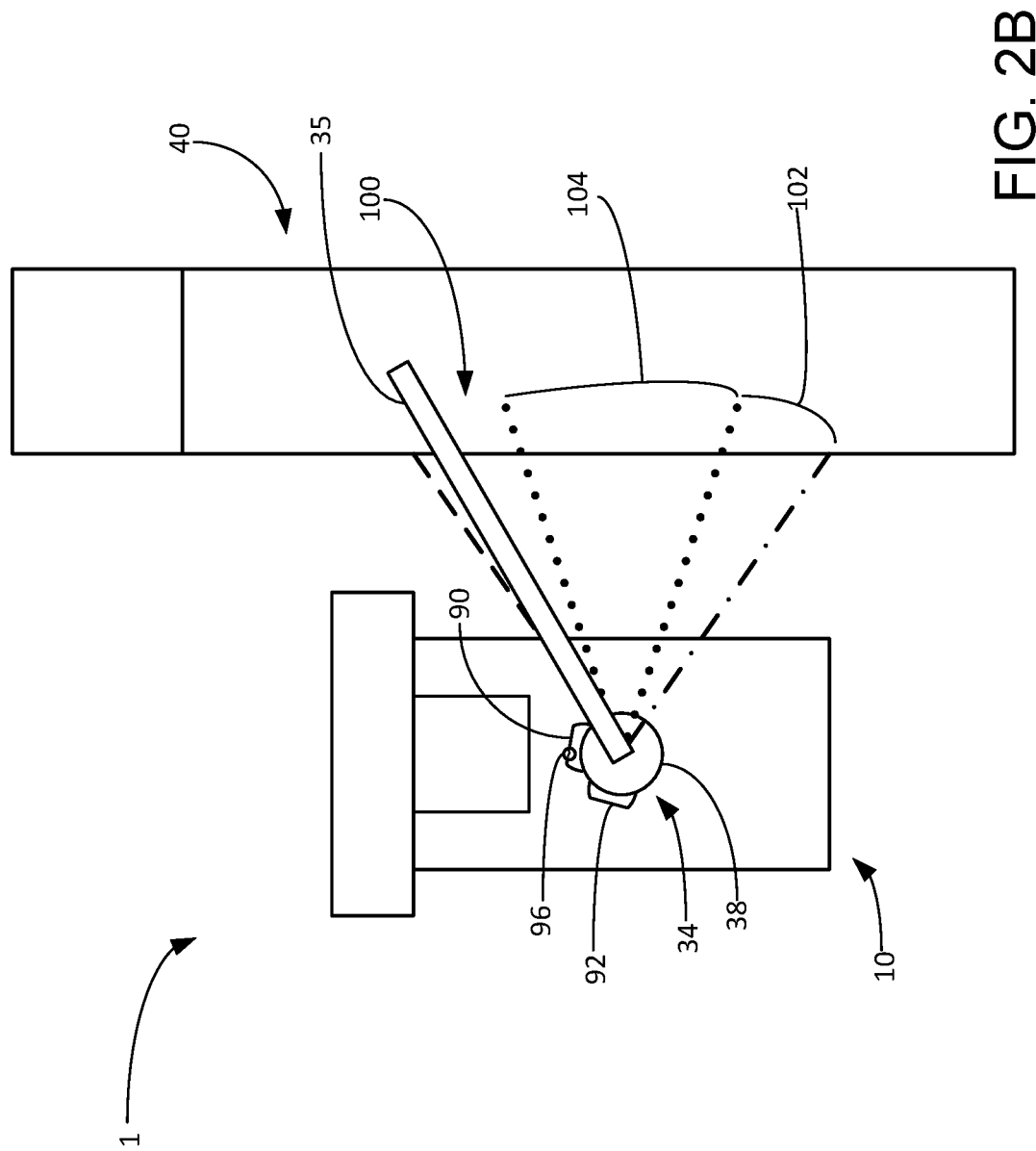
FIG. 2B is a schematic overhead diagram of elements of the system shown in FIG. 2A, with the transfer spout being shown with a rotational orientation in a first range of angular values, according to an illustrative embodiment.
Figure 2C:
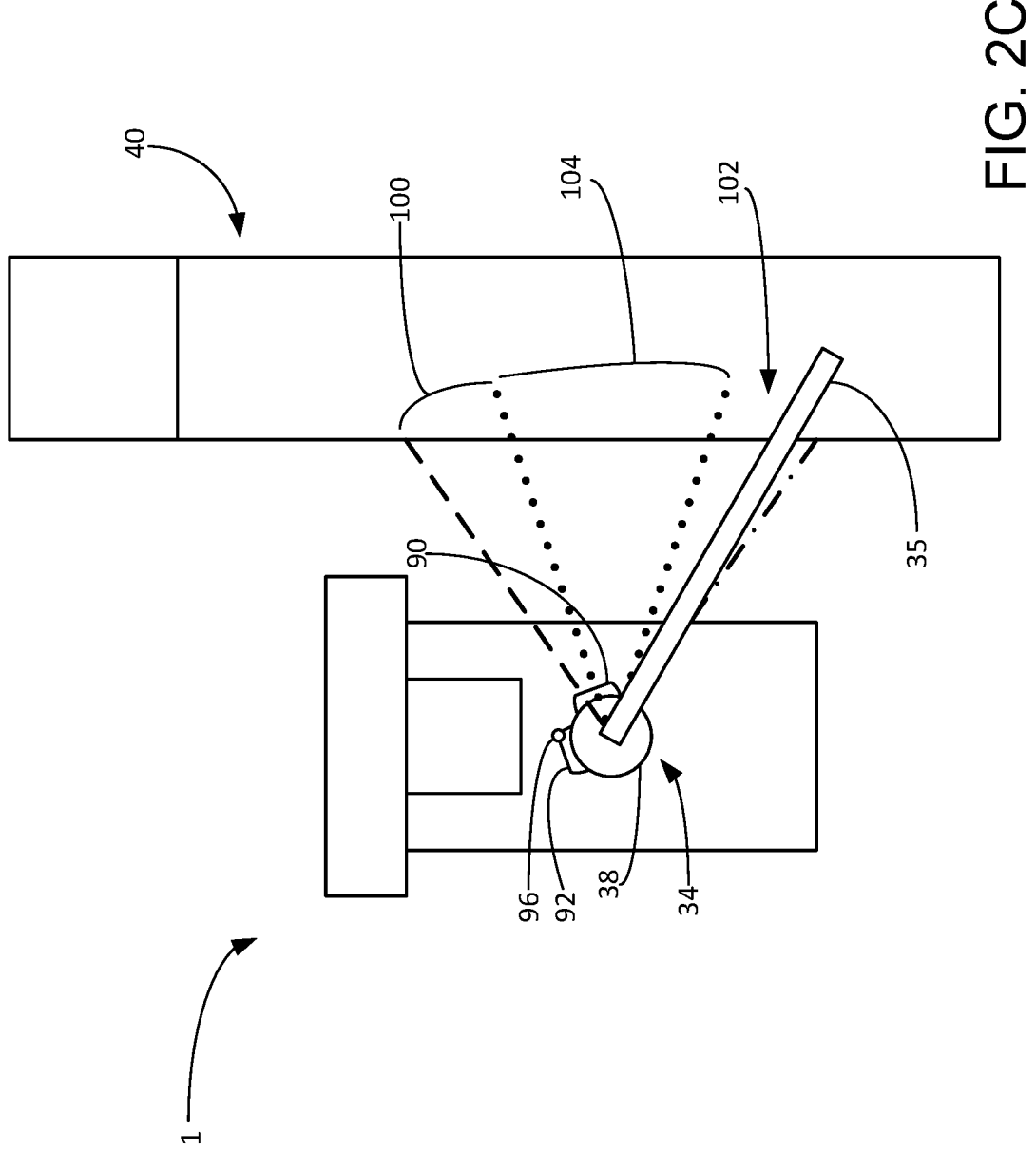
FIG. 2C is a schematic overhead diagram of elements of the system shown in FIGS. 2A and 2B, with the transfer spout being shown with a rotational orientation in a second range of angular values, according to an illustrative embodiment.

With reference now to the drawings, and in particular to FIGS. 1 through 12 thereof, a new system and apparatus for providing driver pacing information for agricultural vehicles embodying the principles and concepts of the disclosed subject matter will be described.

The applicants have recognized that the coordination of movement between a crop harvesting apparatus and the crop materials transporting vehicle utilized to receive and transport the crop materials harvested by the crop harvesting apparatus is important, but is often complicated by a number of circumstances. Typically, the transfer of the crop materials from the harvesting apparatus to the transporting vehicle occurs in an agricultural field and as the harvesting apparatus is moving across the field and gathering the plants being harvested, and thus the harvesting apparatus and the transport vehicle move substantially in tandem with each other across the surface of the field. The transporting vehicle generally moves across the field with the harvesting apparatus to collect the crop materials shortly after the crop materials have been gathered from the field and processed by the harvester apparatus. The transporting vehicle typically has a container or hopper with an open top for receiving the crop materials dispensed from a transfer spout of the harvesting apparatus which is able to extend in a cantilevered manner from the apparatus. The transport vehicle may vary in configuration, and may include configurations such as an agricultural tractor pulling a wagon trailer, a straight truck having a hopper mounted on the same frame as the engine and running gear, and a semi-tractor with the engine and running gear towing a semi-trailer with the hopper. These different types of transporting vehicles can have significantly different lengths, and during the transfer of the crop materials to the hopper of the transporting vehicle, the relative position of the transfer spout along the length of the open top of the hopper may need to be adjusted to achieve a relatively uniform distribution of the crop materials in the hopper without spillage of the crop materials over the side of the hopper. The length of the hopper as well as the need to move the hopper with respect to the transfer spout as the hopper is filled with crop material can make it difficult for the driver of the transport vehicle to accurately position the vehicle with respect to the harvesting apparatus, particularly because the driver of the transport vehicle is positioned ahead (to varying degrees) of the harvesting apparatus and has a limited perspective or view on the position of the transfer spout with respect to the hopper, as well as the areas of the hopper which have been filled and which areas remain unfilled. Further, the distance between the vehicle driver and transfer spout of the harvesting apparatus can become quite significant when the rearmost portion of the hopper of a semi-trailer is being filled by the transfer spout.

The operator of the harvesting apparatus typically has a better vantage point for viewing the position of the transfer spout with respect to the length of the hopper as well as a better understanding of the progress for filling the hopper and the need to change the position of the dispensing end of the transfer spout with respect to the hopper, so typically the harvesting apparatus operator is in the best position to decide the ideal position (or at least the range of most suitable positions) of the transporting vehicle with respect to the harvesting apparatus. However, monitoring the position of the transfer spout with respect to the hopper may place a physical strain on the operator, particularly when the operator attempts to visually monitor the transfer spout when the spout is rotated rearwardly, often requiring the operator to turn his or her head to look backward.

However, a significant challenge arises in communicating by the harvesting apparatus operator to the transport vehicle driver the appropriate operation of the vehicle, such as, for example, speeding the vehicle up with respect to the harvesting apparatus, slowing the vehicle down with respect to the harvesting apparatus, or maintaining the current speed of the vehicle with respect to the harvesting apparatus. Such instructions will change based upon various factors including, for example, the positioning of the crop materials already in the hopper. Conventionally, the communication has been handled by voice communications using, for example, a walkie-talkie or cellular telephone, but this approach can be problematic because it can take the attention of the harvesting apparatus operator and/or the vehicle driver away from his or her primary task, so there can be a disincentive to provide or receive sufficiently frequent updates of the instructions for movement of the transfer vehicle. Even under the best conditions the required communication often places a mental strain on the operator due to the concentration required to periodically view the position of the dispensing end of the spout with respect to the hopper and verbally communicate directions via the communication device to the driver of the transport vehicle.

With respect to the transport vehicle, the vehicle driver not only needs to operate the vehicle at the appropriate speed with respect to the harvesting apparatus, but also must maintain a suitable and safe lateral separation between the paths of the harvester apparatus and the transport vehicle to avoid, for example, driving over some of the unharvested crop or even colliding with the head of the harvester apparatus if the separation becomes too narrow or nonexistent, or possibly losing some of the crop material being transferred if the separation becomes too great and the transfer spout is no longer positioned above the open top of the hopper.

The applicants have developed a system in which (1) communication of a suitable speed to the vehicle driver may be automatic, and the communication does not necessarily require intervention or action by the operator of the harvesting apparatus to formulate and enunciate the instruction or otherwise cause the instruction to be communicated to the driver. The applicants have also developed a system in which (2) the guidance or instructions communicated may be based upon the orientation of the transfer spout with respect to the remainder of the harvester apparatus, and the control of the movement of the transfer spout by the operator of the harvester apparatus may provide the operator with the ability to influence the instructions communicated to the vehicle driver by the system. The applicants have further developed a system in which (3) the instructions may be communicated visually to the vehicle driver in a manner that does not require the driver to interpret the orientation of the transfer spout with respect to the harvester apparatus or determine the relative position of the transfer spout with respect to the hopper of the drivers vehicle. In some implementations, the vehicle driver may not even need to remove his or her vision from the path ahead. Still further, the applicants have developed a system in which the (4) operation or effectiveness of the system may not rely primarily upon visual observation by the operator of the harvesting apparatus operator or the driver of the vehicle driver, and therefore the system may be highly useful when harvesting in low light conditions, such as at night, when a significant amount of harvesting is performed.

In some of the broadest aspects, the disclosure relates to a system 1 useful for, in a general sense, the movement or removal of materials positioned on or adjacent to a ground surface to a location elevated above the ground surface for transport to another location, such as, for example, during the harvesting or otherwise removing crop materials from an agricultural field and placing the materials in a vehicle. In a broad sense, the system 1 may include a mobile machine 2 configured to move across a ground surface 3 and gather material from a location adjacent to the ground surface and dispense the material from a dispensing structure 4 of the machine at an elevated location with respect to the ground surface, and the dispensing structure 4 may be movable to change a trajectory of material exiting the dispensing structure. The mobile machine 2 is typically operated by an operator. In broad aspects, the system 1 may further include a transport vehicle 5 having a raised container 6 or hopper that is configured to receive the material from the mobile machine 2. The transport vehicle 5 is typically operated by a driver. In a few illustrative non-limiting examples of more specific applications of the system 1, the mobile machine 2 may comprise an agricultural combine and the transport vehicle 5 may comprise a grain cart, and the machine 2 may comprise a snowplow and the vehicle 5 may comprise a dump truck.

In the illustrative embodiments of this disclosure, the mobile machine 2 comprises a harvester 10 or other suitable apparatus for harvesting crop materials from an agricultural field (see, for example, FIGS. 1 and 2). In general, the harvester 10 may have a front 12 which is generally oriented toward a normal direction of travel for the harvester and a rear 14 which is generally oriented away from the normal direction of travel. The harvester 10 also has lateral sides 16, 18 which generally extend between the front 12 and the rear 14. In operation, the harvester 10 may have a harvester speed of travel or movement across the soil surface of the agricultural field, and at any point in time, may have a current speed of travel.

In greater detail, an illustrative harvester 10 may include a frame 20 which may extend generally between the front 12 and the rear 14 of the harvester, and on which other components of the harvester may be mounted. The harvester 10 may further include an operator cab 22 for accommodating an operator of the harvester. The cab 22 is mounted on the frame 20, and may be located toward the front 12 of the harvester. Further, a handrail 23 may be positioned adjacent to the cab 22, and may be portions of the handrail may be substantially horizontally oriented. Illustratively, the harvester may further include a pair of forward wheels 24, 25 rotatable with respect to the frame on a forward axle mounted on the frame 20 toward the front 12 of the harvester, and a pair of rearward wheels rotatable with respect to the frame mounted on a rearward axle mounted on the frame toward the rear of the harvester. A harvester head 30 may be mounted on the frame 20 of the harvester to convey the crop material from plants growing in the agricultural field. The harvester head 30 may be located on the frame toward the front of the harvester, often forwardly of the operator cab 22. The harvester head 30 may be elongated in a lateral direction and may have opposite lateral ends 32, 33.

The harvester 10 may further include a transfer spout assembly 34 for transferring harvested crop materials from the harvester to another vehicle having the capability to hold a large quantity of the crop material. The transfer spout assembly 34 may include a transfer spout 35 for guiding movement of the crop materials from the harvester to the vehicle. The transfer spout 35 may be elongated in shape, and may have a base end 36 mounted on the frame 20 and a dispensing end 37 located on the spout 34 opposite of the base end 36. The dispensing end 37 may be a free end which is otherwise untethered to the frame other than through the mounting of the base end. The base end 36 may be movably mounted on the frame 20, and may be pivotably movable with respect to the frame to permit the orientation of the spout with respect to the frame to be changed such that the position of the transfer spout, and particularly the dispensing end of the spout may be adjusted to change the path of materials exiting and projecting from the dispensing end of the spout. In the illustrative embodiments, the transfer spout assembly 34 may further include a base rotation structure 38 that is united with the transfer spout 35 and is movable with respect to the frame 20 of the harvester. The base end 36 of the transfer spout may be united with the rotation structure 38, and the structure 38 may be rotatable with respect to the frame of the harvester such that rotation of the structure 38 rotates the orientation of the spout with respect to the frame. The base rotation structure 38 may have teeth positioned along the periphery of the structure for being engaged by an actuating gear to rotate the structure with respect to the frame.

The dispensing end 37 of the transfer spout may be positionable at a range of positions along at least one of the lateral sides of the harvester, and may have a range of positions along both lateral sides of the harvester. In such configurations, the dispensing end 38 may be movable along a substantially horizontal arc adjacent to one of the lateral sides of the harvester during movement across the agricultural field, but movement of the transfer spout, and thus the dispensing end, between the opposite sides of the harvester may also be possible in between passes. Typically, the base rotation structure 38 may be mounted on the frame 20 at a location rearward of the operator cab 22, and at least a portion of the transfer spout 34 may be elevated above the operator cab. Typically, the orientation of the transfer spout relative to the frame is under the control of the operator of the harvester located in the cab of the harvester, and the operator is able to control the positioning of dispensing end of the spout according to his or her preferences.

In some implementations, the transfer spout assembly 34 may additionally include an orientation sensor 39 which is configured to sense an orientation of the transfer spout with respect to the frame, and in particular the orientation sensor 39 may be an element of the harvester which is installed and integrated into the harvester by an original equipment manufacturer (OEM) of the harvester for the purpose of sensing the orientation of the transfer spout and generating a proprietary signal which is indicative of the orientation of the transfer spout with respect to the frame of the harvester.

In the broadly disclosed system 1, the transport vehicle 5 may comprise a crop material transport vehicle 40 for receiving crop material from the harvester for transport from the harvester location in the agricultural field to a destination for further processing and/or storage (see, for example, FIG. 1). The transport vehicle 40 may move across the agricultural field independently of the harvester 10, but typically with some degree of coordination with the harvester movement, at a transport vehicle speed of travel. The transport vehicle 40 typically has a driver cab in which a driver of the vehicle may be positioned while operating the vehicle 40, usually in coordination with the movement of the harvester 10 across the surface of the agricultural field. The transport vehicle 40 has a crop material hopper 42 which defines a hopper interior 44 that receives the crop material from the harvester, often as the harvester is moving across the agricultural field and cutting crop material from the soil. The crop material hopper 42 has an open top into which the crop material is placed into the hopper interior 44. Some hopper configurations may have an open side through which material may be introduced into the hopper interior. The dispensing end 37 of the spout is typically maintained in a position over the open top (or adjacent to the open side) of the crop material hopper 42 such that crop material exiting or being dispensed from the dispensing end 37 falls through the open top and into the interior 44 of the hopper 42. In some implementations, the transport vehicle 40 may comprise a tractor 46 towing a wagon 48 which incorporates the hopper 42. In other implementations, the transport vehicle 40 may comprise a truck incorporating the hopper 42.

A significant feature of the system 1 may be a driver pacing information apparatus 50 for providing the driver of the transport vehicle 40 with pacing information useful in operating the transport vehicle alongside the harvester 10, such as for accomplishing the proper or desired relative positioning of the transport vehicle with respect to the harvester, particularly as the harvester and the vehicle move across the agricultural field during harvesting operations. In some implementations, the desired positioning of the transport vehicle with respect to the harvester, and thus the desired pacing of the vehicle with respect to the harvester, may be indicated by the relative positioning of the transfer spout with respect to another element of the harvester, such as the frame of the harvester.

In some embodiments, the pacing information apparatus 50 may include a position sensing assembly 52 for sensing a position of the transfer spout with respect to the frame of the harvester. In various implementations, the position sensing assembly 52 may be configured to physically or mechanically even electronically sense the position of the spout. Optionally, the position sensing assembly 52 may be interfaced directly or indirectly with the mechanism, or an operator control utilized to control the mechanism, utilized to adjust the position of the spout.

In implementations, the position sensing assembly 52 may be configured to detect the rotational orientation of the transfer spout 34 with respect to the frame 20 of the harvester, and the rotational orientation may be an angular value. The angular value may be in one range of a plurality of ranges of angular values. In some illustrative implementations, the plurality of ranges may comprise a first range 100 of angular values, a second range 102 of angular values. Additionally, in some illustrative implementations, a third range 104 of angular values may be utilized. Optionally, additional ranges or fewer ranges may be utilized (see FIGS. 2A through 2C). The first range 100 of angular values may be associated with a rotational orientation of the transfer spout 35 in which the spout and the dispensing end 37 of the spout is rotated toward the front of the harvester, and consequently toward the front of the transport vehicle 40 (see, e.g., FIG. 2A). In general, the first range 100 of angular values may be associated with a situation in which a decrease in the speed or pace of movement of the transport vehicle would be suitable or desirable, and correspondingly it would be suitable or desirable to provide an indication to the driver of the transport vehicle to decrease the speed of travel of the vehicle from the current speed of travel. In the illustrative implementation, the second range 102 of angular values may be associated with a rotational orientation of the transfer spout 35 in which the spout and the dispensing end of the spout is rotated toward the rear of the harvester, and consequently toward a rear of the transport vehicle 40 (see, e.g., FIG. 2B). In general, the second range 102 of angular values may be associated with a situation in which an increase in the speed or pace of movement of the transport vehicle would be suitable or desirable, and correspondingly it would be suitable or desirable to provide an indication to the driver of the transport vehicle to increase the speed of travel of the transport vehicle from the current speed of travel. In the illustrative implementation, a third range 104 of angular values may be between the first range of rotational values and the second range of rotational values (see, e.g., FIG. 2C), and the third range of angular values may be associated with a rotational orientation of the transfer spout 35 in which the spout and the dispensing end of the transfer spout is not significantly or substantially rotated either toward the front or forward the rear of the harvester, but any rotation of the spout from an orientation perpendicular to the path of movement of the harvester (and the path of movement of the vehicle) may fall within a narrow angular range from the perpendicular. The third range 104 of values may be associated with a situation in which continuation or maintenance of substantially the same speed or pace of movement in the transport vehicle would be suitable or desirable, and correspondingly it would be suitable or desirable to provide an indication to the driver of the transport vehicle to maintain the current speed of travel of the transport vehicle.

The position sensing assembly 52 may generate a position signal which is representative of the approximate position of the spout 34 with respect to the frame 20. In the illustrative implementations, the position sensing assembly 52 may generate a first position signal when the position sensor detects that the angular value is in the first range of angular values. Optionally, the value of the first position signal may vary based upon the angular value within the first range of angular values, and accordingly the first position signal may have a correspondingly greater angular value in the first range of angular values when the rotational orientation is more toward the front of the harvester. Also, the position sensing assembly 52 may generate a second position signal when the position sensor detects that the angular value is in the second range of angular values. Optionally, the value of the second position single may vary based upon the angular value within the range of angular values, and accordingly the second position signal may have a correspondingly greater angular value in the second range of angular values when the rotational orientation is more toward the rear of the harvester. Further, the position sensing assembly 52 may generate a third position signal when the position sensor detects that the angular value is in the third range of angular values. Again, optionally the value of the third position signal may vary based upon the angular value within the range of angular values.

Figure 3:
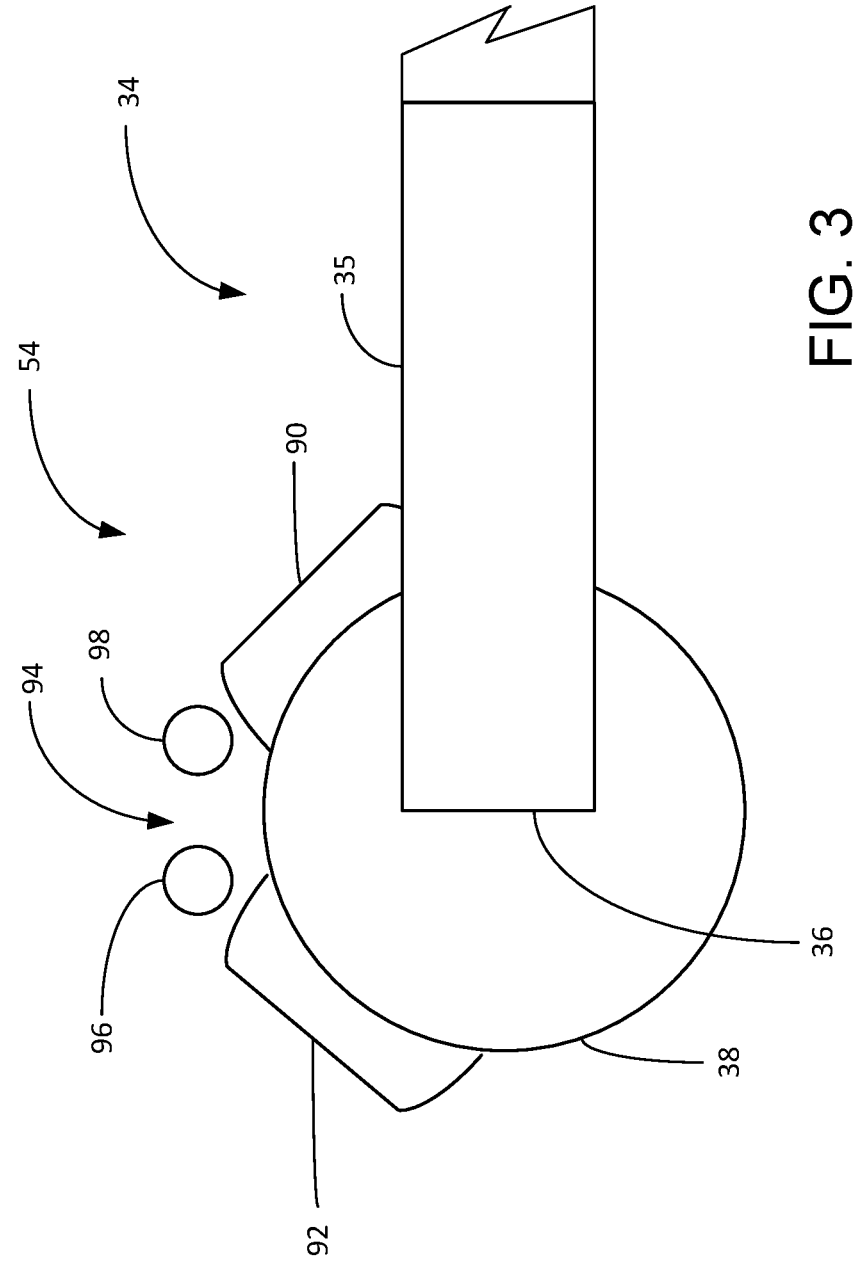
FIG. 3 is a schematic diagram of elements of the harvester transfer spout assembly and the position sensing assembly of the pacing information apparatus, according to an illustrative embodiment.

In some embodiments, the position sensing assembly 52 may include a position sensor mechanism 54 in communication with the transfer spout 35 to sense the position of the transfer spout with respect to the frame 20, and may utilize mechanical and electrical elements (see, e.g., FIGS. 2 and 3). The position sensor mechanism 54 may also include a first rotation element 90 which is mountable on the base rotation structure 38, such as along a first portion of the perimeter of the structure, and rotational movement of the base rotation structure may function to rotate the first rotation element. The position of the first rotation element 90 on the base rotation structure may be selected so as to correspond to the first range of angular values. The position sensing assembly 52 may further include a second rotation element 92 which is mountable on the base rotation structure 38, such as along a second portion of the perimeter of the structure, and rotational movement of the structure 38 may function to rotate the second rotation element. The position of the second rotation element 92 on the base rotation structure may be selected so as to correspond to the second range of angular values. In embodiments, the positions of the first 90 and second 92 rotation elements on the base rotation structure may be adjustable to adjust when the second and third position signals are generated by the position sensor to permit fine tuning of the point at which the position signals are generated. Illustratively, the first and second rotation elements may comprise members or plates that may be shiftable to different positions on a base plate and secured in the selected positions on the base plate by fasteners that may be loosened for adjustment and then tightened to set the adjustment of the respective element 90, 92. Additionally, a gap 94 may be formed between the first 90 and second 92 rotation elements, and the position of the gap may correspond to the third range of angular values. The position sensor mechanism 54 of the position sensing assembly may include at least one sensor 96 which is configured to sense a relative proximity of one of the rotation elements to the sensor 96. The sensor 96 may be mountable on the frame 20 of the harvester adjacent to the base rotation structure 38 such that rotation of the structure 38 moves the rotation elements into and out of proximity to the sensor. Illustratively, movement of the base rotation structure 38 that brings the sensor 96 into a position adjacent to the first rotation element 90 may cause the position sensing assembly 52 to generate the first position signal, and movement of the base rotation structure that brings the sensor into a position adjacent to the second rotation element 92 may cause the position sensing assembly 52 to generate the second position signal. Such movements may be substantially opposite in the direction of movement, and opposite in direction of rotational movement. Further, movement of the base rotation structure 38 that effectively moves the sensor 96 adjacent to the gap 94 between the first and second rotation elements may cause the position sensor to generate the first position signal. In some implementations, positions of the sensor 96 adjacent to the gap 94 may result in no generation of a position signal.

In some implementations, the position sensing assembly 52 may include a plurality of sensors 54. The position sensor 54 or sensors may be mounted on the frame 20 of the harvester, or an element mounted on the frame, and may be positioned toward the base end 36 of the transfer spout. Illustratively, the position sensor 54 includes a first sensor 96 and a second sensor 98, with each of the sensors 96, 98 being positioned adjacent to the base rotation structure but being spaced from each other along the circumference of the base rotation structure (see, e.g., FIG. 3).

Figure 4:
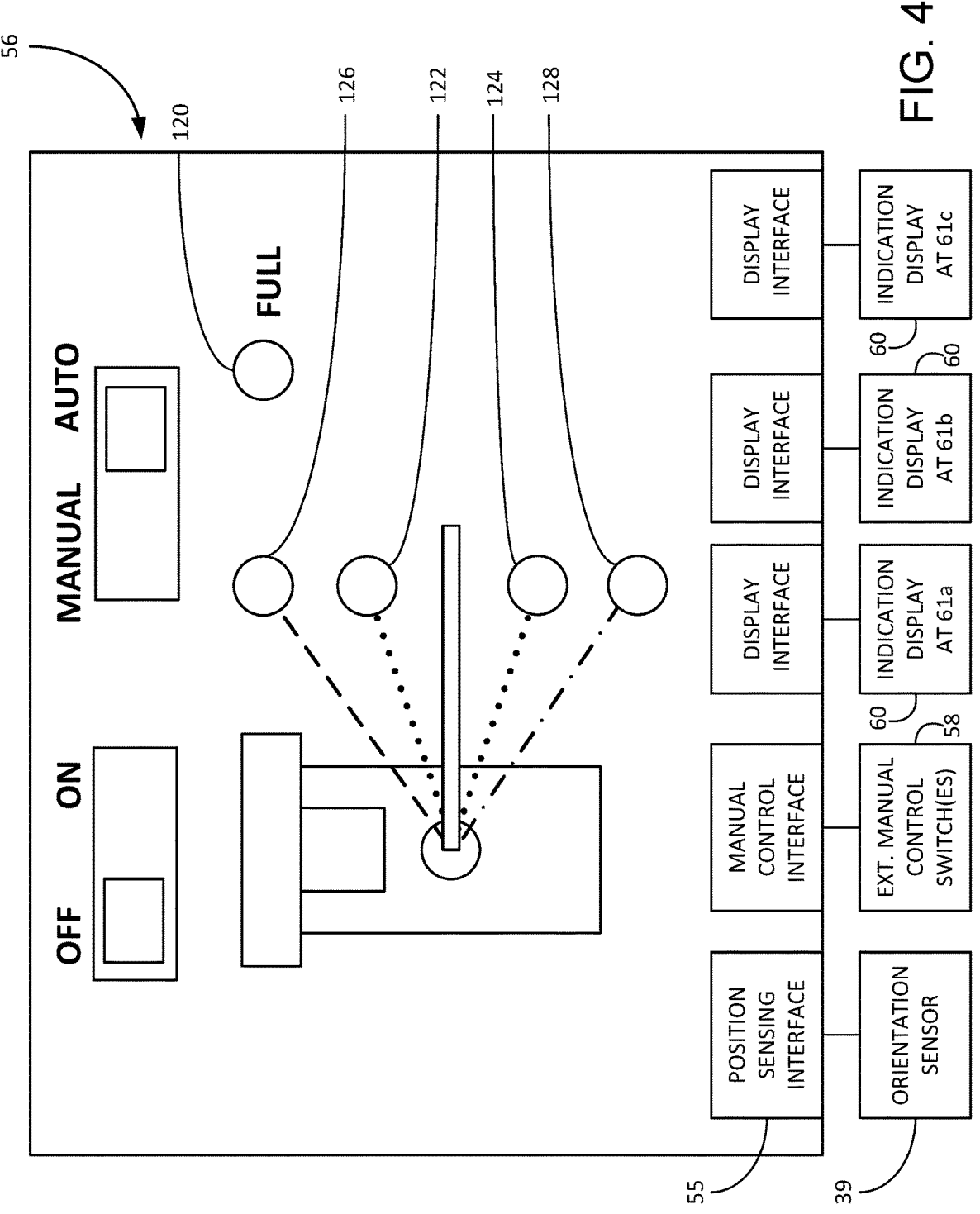
FIG. 4 is a schematic diagram of an illustrative embodiment of an optional position sensing assembly of the pacing information apparatus, according to an illustrative embodiment.

In some further embodiments, the operator actuatable interface mechanism 56 of the position sensing assembly 52 may comprise a position sensing interface 55 which is configured to interface with the orientation sensor 39 of the transfer spout assembly of the harvester (see, e.g., FIG. 4). The position sensing interface 55 may further be configured to recognize proprietary signals from the orientation sensor 39 that are associated with the first range of angular values and generate the first position signal, and also recognize proprietary signals from the orientation sensor associated with the second range of angular values and generate the second position signal. Further, the position sensing interface 55 may be configured to recognize proprietary signals from the orientation sensor 39 that are associated with the third range of angular values and generate the third position signal.

In some embodiments, the driver pacing information apparatus 50 may include an operator actuatable interface mechanism 56 (see, e.g., FIG. 4) for receiving direct input from the operator of the mobile machine, or harvester. In some implementations, the operator actuatable interface mechanism 56 may facilitate more direct control of the specific signaling output by the apparatus 50 to the driver of the transport vehicle 40 without the input being automatically generated via a position sensor mechanism. The interface mechanism 56 may be configured to be positioned in the operator cab 22 of the harvester to facilitate tactile and visual access to the mechanism 56 by the operator during operation of the harvester. Illustratively, an operator actuatable input device 58 may be connectable to the operator actuatable interface mechanism 56 for receiving positioning information directly from the operator of the harvester 10 for display to the vehicle driver, usually without any automatic intervention by the apparatus 50. The operator input device 58 may have at least two states, with a first one of the states of the device 58 generating the first position signal and a second one of the states of the device generating the second position signal. Optionally, the operator input device 58 may also have a third state which may generate the third position signal. The operator input device 58 may include an element which is directly or manually actuatable by the operator to produce simultaneous or substantially simultaneous changes in the signaling displayed to the vehicle driver. Illustratively, the operator input device 58 may comprise at least one switch which may be actuatable or operable by an appendage of the operator. In one example, the switch 58 may comprise at least one button operable by the hand of the operator, and may include a pair of the buttons. In another example, the switch may comprise at least one pedal operable by the foot of the operator, and may include a pair of pedals. In a further example, the switch may comprise at least one paddle switch operable by the hand of the operator, and may include a pair of paddle switches. As a further option, the interface mechanism 56 may be provided with a user actuatable switch 120 which, when actuated by the operator, provides a signal recognized by the vehicle operator to indicate that the container 6 of the vehicle is full, or at least is at a condition that emptying of the container is desirable. Such a condition may be visually sensed by the operator and the operator may actuate the switch 120 to cause a signal to be transmitted to the vehicle driver, such as, for example, flashing light sources of a display.

In further implementations, the operator actuatable interface mechanism 56 may facilitate setting or establishing by the operator the boundaries and extents of the first range 100, the second range 102, and even the third range 104 of angular values utilized by the apparatus 50 to display, or change the display of, pacing indications to the vehicle driver, based upon the position of the spout in the various ranges. Illustratively, such as is shown in FIG. 4, the interface mechanism 56 may have indicia or symbols representative of the harvester 10 and the approximate range of movement of the transfer spout 34, and may also include indicia generally suggestive of the positions of the spout in the various first, second, and third ranges. The interface mechanism 56 may be provided with a plurality of switches, such as buttons, which each may be associated with one of the boundaries of one of the ranges 100, 102, and 104.

For example, a first boundary switch 122 may be provided to set the boundary between the first 100 and third 104 ranges of the movement of the transfer spout 34. In operation, the operator of the harvester may rotate the transfer spout to a rotational position corresponding to the operator's desired boundary or border location between the first 100 and the third 104 ranges, and the operator may actuate the switch 122 to have the rotational position of the spout recorded as the boundary between the first and third ranges. Once set, the apparatus 50 may utilize the rotational position of the spout indicated by the operator (and stored by the apparatus 50) using the first boundary switch 122 to determine when the transfer spout has entered the first range 100 from the third range 104, or exited the first range 100 into the third range 104.

In a further example, a second boundary switch 124 may be provided to set the boundary between the second 102 and third 104 ranges of the movement of the transfer spout 34. The operator may rotate the transfer spout to the operator's desired boundary location between the second 102 and third 104 ranges, and actuate the switch 124 to record the rotational position of the spout 34 at the time of the actuation of the switch 124 as the boundary between the second and third ranges. Additionally, a third boundary switch 126 may be provided to set the outer boundary of the first range (e.g., opposite of the boundary between the first and third ranges) and a fourth boundary switch 128 may be provided to set the outer boundary of the second range (e.g., opposite of the boundary between the second and third ranges). Operation of the third 126 and fourth 128 boundary switches may also entail rotation of the transfer spout 34 to the respective rotational positions and actuation of the respective switch when the spout has attained the desired position of the boundary. Illustratively, the positions of the boundary switches may be coordinated with the indicia on the interface mechanism to produce a spatial correlation between the boundary being set by the actuation of the respective switch and the position of the switch with respect to the indicia representative of the harvester. Optionally, one or more of the boundary switches may incorporate a light source which may be illuminated when the rotational position of the transfer spout 34 is located in the corresponding range.

In some embodiments, the operator actuatable interface mechanism 56 may include controls for other purposes, including a power control switch for the information apparatus 50 and a control switch for toggling apparatus operation between manual operation and automatic operation.

Figure 5:
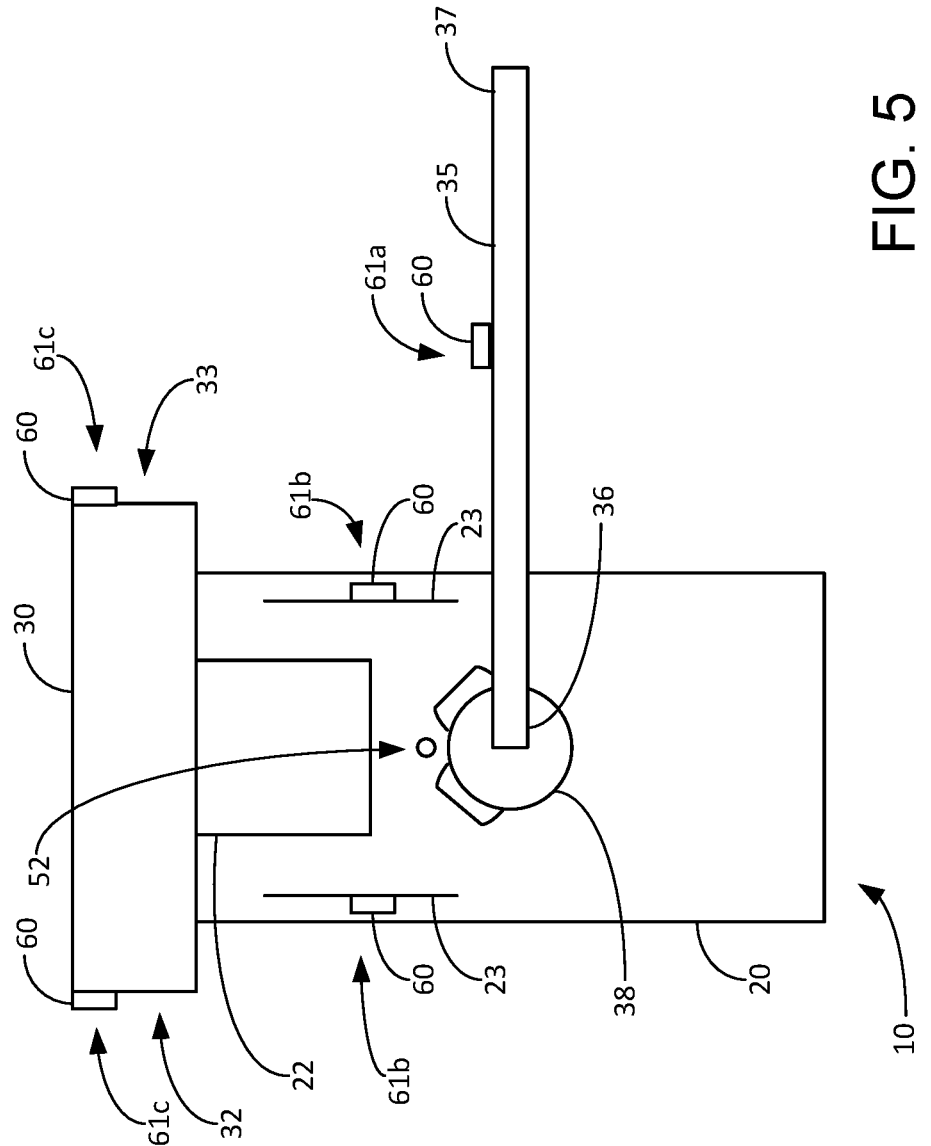
FIG. 5 is a schematic diagram of elements of the system including the harvester and pacing indication displays of the pacing information apparatus at illustrative locations on the harvester, according to an illustrative embodiment.

The driver pacing information apparatus 50 may also include a pacing indication display 60 for providing pacing information to the driver of the transport vehicle 40 so that the driver may take an action that may correspond to the character of the pacing information, such as speeding up the movement of the vehicle 40 or slowing down the movement of the vehicle 40 across the agricultural field (see, for example, FIGS. 5 and 6). In the illustrative embodiments, the indication display 60 provides the pacing information visually, or in a visual manner, to the driver of the vehicle, although provision of the pacing information in other sensibly-perceptible forms, such as audibly or even tactilely, may be utilized and in such cases, "display" is intended in a broad sense to cover devices that are able to provide an indication that is perceptible to more (or different) senses than only vision. Further, the driver pacing information apparatus 50 may include a single pacing indication display 60 or a plurality of the indication displays.

Illustratively, for pacing indication displays 60 utilizing visual cues, the display 60 may be positioned at virtually any location on the harvester that is capable of being viewed by a driver of the transport vehicle 40 at a variety of positions of the vehicle laterally alongside the harvester so as to be visually apparent to the vehicle driver. The illustrative embodiments include a variety of positions for the pacing indication display 60, and one or more of these positions may be utilized, or other positions may be utilized instead or in addition to one or more of these positions.

In the illustrative embodiments, the pacing indication display 60 may be configured to be positionable on the harvester at a first location 61*a* which is on the transfer spout 35 of the harvester (see, e.g., FIG. 5). The location 61*a* may be toward a midpoint of a length of the transfer spout, or may be at some point generally between the midpoint of the length and the dispensing end 37 of the spout. Optionally, the display 60 may be mounted on the transfer spout 35 in a manner so that the display extends or depends downwardly from the spout in a manner that may be visible in both forward and rearward directions with respect to the spout. Additionally, the pacing indication display 60 may be configured to be positionable on the harvester at a second location 61*b* which is relatively closely adjacent to the operator cab 22 of the harvester, such as, for example on the handrail of the harvester or other structure associated with the cab 22. Optionally, the second location 61*b* may include locations on the handrail on each side of the operator cab, and accordingly a display 60 may be mounted on each of the handrails and sides of the cab to provide enhanced visibility of the display on opposite sides of the harvester. Further, the pacing indication display 60 may be configured to be positionable on the harvester at a third location 61*c* which is on the harvester head 30, and the display may be mounted on the harvester head at various locations, such as, for example, one of the lateral ends 32, 33 of the harvester head. In some applications, a display 60 may be mounted on each of the lateral ends of the harvester head to provide enhanced visibility of the display on both sides of the harvester.

In other embodiments, the pacing indication display 60 may be configured to be located at locations other than locations on the exterior of the harvester, such as a location 61*d* in the interior of the operator cab of the harvester to provide an indication to the operator of the harvester the mode of the information apparatus 50 via a display 60 which is positioned adjacent to the displays of other systems of the harvester, such as on or adjacent to a control panel in the cab of the harvester. The pacing indication display 60 may also be located in a location separate of the harvester. For example, another location for a pacing indication display 60 may be on the transport vehicle 40 and may be located adjacent to, or inside of, the driver cab of the vehicle 40. Illustratively, the display 60 may be mounted in the interior of the driver cab of the vehicle 40 to facilitate viewing of the display by the vehicle driver without the driver having to view one of the display 60 through a window or in a rearview mirror of the vehicle, and endure any strain that may result.

Further, the pacing indication display 60 may be movable between various positions on the harvester to provide suitable locations for different types of transport vehicles, different driver preferences, etc. Optionally, the indication display 60 may be configured to be viewable from more than one side and from more than one perspective or point of view, which may be highly useful when the display 60 is mounted on transfer spout 34.

The pacing indication display 60 may have a plurality of display modes, and the display modes may each correspond to the character of the pacing information to be communicated to the driver of the vehicle 40. In an illustrative example, a first one of the display modes of the display 60 may comprise a faster-speed mode associated with a speed condition in which the transport vehicle speed of travel is, or optimally should be, faster than the harvester speed of travel such that the position of the transport vehicle moves forward relative to the harvester. The indication display 60 may be in the first display mode when the position sensor is generating or has generated the first position signal, and the display 60 may be in the first display mode when the display receives a first display signal corresponding to the first position signal. In a further illustrative example, a second one of the display modes of the display 60 may comprise a slower-speed mode associated with a speed condition in which the transport vehicle speed of travel is, or optimally should be, slower than the harvester speed of travel such that the position of the transport vehicle moves rearward relative to the harvester. The indication display 60 may be in the second display mode when the position sensor is generating or has generated the second position signal, and the display 60 may be in the second display mode when the display receives a second display signal. In a still further illustrative example, a third one of the display modes of the display 60 may comprise a steady-speed mode associated with a speed condition in which the transport vehicle speed of travel is, or optimally should be, substantially equal to the harvester speed of travel. The indication display 60 may be in the third display mode when the position sensor 54 is generating or has generated the third position signal, and the display 60 may be in the third display mode when the display 60 receives a third display signal corresponding to the third position signal.

The pacing indication display 60 may include at least one light source 62, and may include a plurality of light sources 62, and the light source or sources may provide steady or intermittent illumination (e.g., flashing). When multiple light sources 62 are employed, the light sources may be grouped such that a plurality of groups is provided. Typically, although not necessarily, the number of groups of light sources may correspond to the number of display modes. In implementations in which one light source is employed, or fewer light sources are employed than the number of display modes, the light source or sources may have the capability to change appearance, such as change color. When multiple lights sources are utilized, the light sources 62 of a particular group may have a similar (or preferably the same) color, and the light sources of different groups may have different or visually distinguishable colors.

Each of the groups of light sources 62 may include at least one light source (see, e.g., FIGS. 6A and 6C), and each group may include a plurality of the light sources (see, e.g., FIGS. 6B and 6D). Illustratively, FIG. 6A illustrates an embodiment in which a single light source is provided for each of the first and second display modes, and no light source is associated with the third display mode. FIG. 6B illustrates an embodiment in which a group of multiple light sources is associated with the first display mode, and a group of multiple light sources is associated with the second display mode. FIG. 6C illustrates an embodiment in which a single light source is provided for each of the first, second, and third display modes. FIG. 6D illustrates an embodiment in which a group of multiple light sources is associated with each of the first and second display modes, and a single light source is associated with the third display mode. In illustrative examples, a first group 64 of the light sources may be associated with the first display mode, and may be illuminated in the first display mode such as when the indication display 60 has received the first display signal. Conversely, the first group 64 of light sources may not be illuminated when the display 60 is in a mode other than the first display mode. Illustratively, the light sources of the first group 64 may illuminate with a red color. Also in the illustrative example, a second group 66 of the light sources 66 may be associated with the second display mode, and may be illuminated in the second display mode such as when the display 60 has received the second display signal. Again, the second group 66 may not be illuminated when the display 60 is in a mode other than the second display mode. Illustratively, the light sources of the second group 66 may illuminate with a green color. Further in the illustrative example, a third group 68 of the light sources may be associated with the third display mode, and may be illuminated in the third display mode such as when the display 60 has received the third display signal. Similarly, the third group 68 may not be illuminated when the display 60 is in the mode other than the third display mode. In embodiments such as is illustrated in FIGS. 6A and 6B, no light source may be illuminated when the display 60 is in the third display mode. Illustratively, the light sources of the third group 68 may illuminate with a blue color. Although the illustrative examples relate to the light sources of different groups being differentiated by color, it should be understood that other appearances or indicia may be utilized to not only differentiate the light sources of different groups, but also the action to be taken by the vehicle driver. For example, the light source or sources of the first group may illuminate a downwardly oriented arrow, while the light source or sources of the second group may illuminate and upwardly oriented arrow (and the light source or sources of the third group, if used, may illuminate a horizontal line). Such is only an example, and those skilled in the art will recognize, in light of the present disclosure, other suitable appearances or indicia.

The plurality of light sources 62 may be arranged in an array. In the illustrative embodiment, the array of light sources 62 may be linear in configuration, although other configurations of the array may be utilized. The first group 64 of light sources may be positioned to one side in the array, the second group 66 of light sources may be positioned to another side of array, opposite of the first group of light sources in the array, and the third group of light sources (when utilized) may be positioned in a centered position between the first and second groups of light sources. Illustratively, the linear array of light sources 62 may be substantially vertically oriented, and the first group may be positioned vertically higher than the second group in the array, and the third group (when utilized) may be positioned vertically between the first group and the second group. Such an arrangement may take advantage of a correlation between the higher position of the first group 64 of light sources and the lower speed mode of the first display mode, and the lower position of the second group 66 of light sources and the faster speed mode of the second display mode. Other orientations of the array of the lights may be employed.

Figure 7:
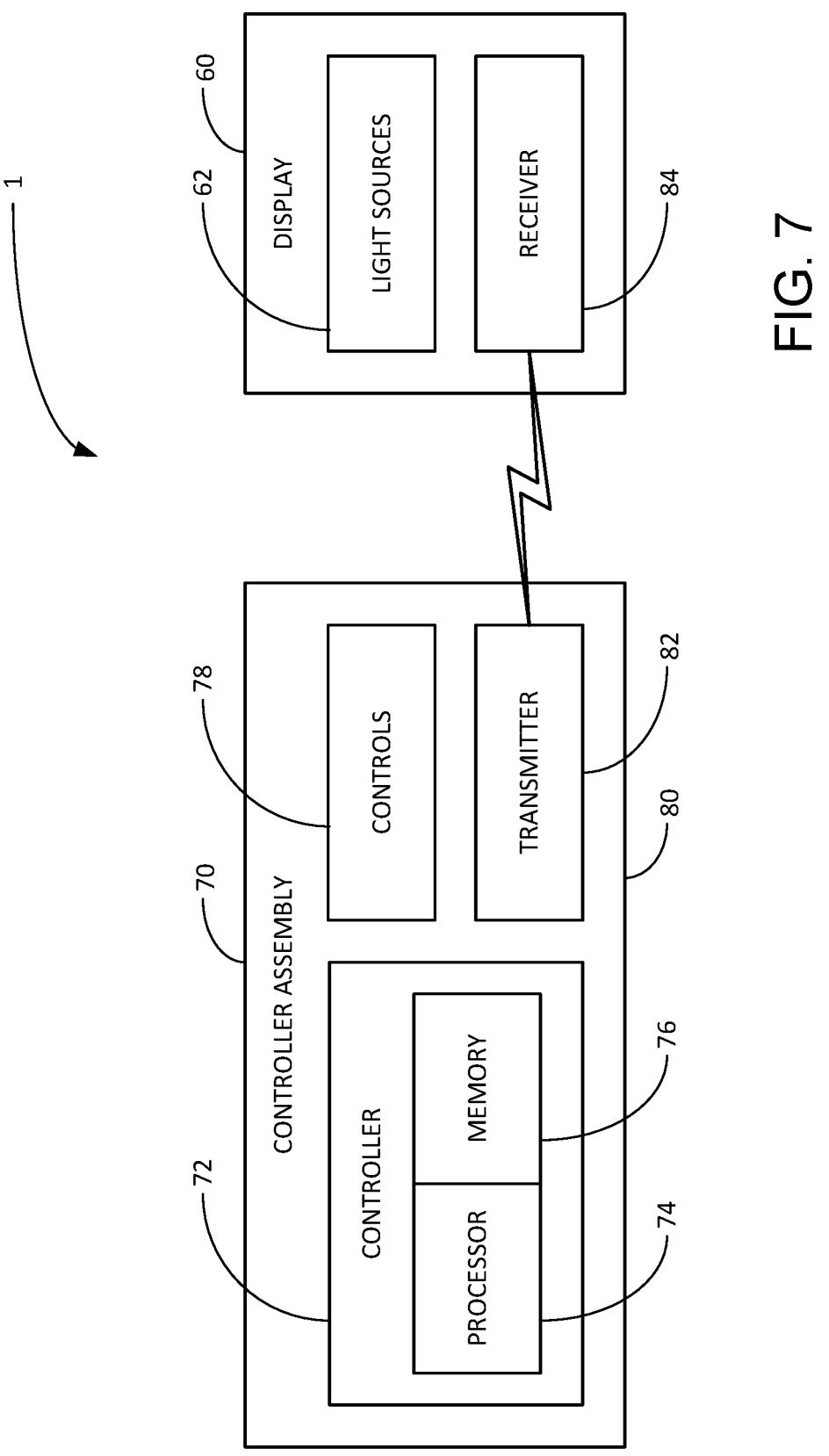
FIG. 7 is a schematic diagram of elements of the controller assembly and the pacing indication display of the pacing information apparatus, according to an illustrative embodiment.

The driver pacing information apparatus 50 may further include a controller assembly 70 that is configured to control the pacing indication display 60 of the apparatus 50 (see, for example, FIG. 7). The controller assembly 70 may be configured to send the display signal to the pacing indication display 60. The controller assembly 70 may receive input and signals from the position sensing assembly 52, such as the position signal from the position sensor 54 of the position sensing assembly for automatically determining and generating an appropriate display signal based upon the current state of the positon signal. Optionally, the display signal may be generated at the specific initiation of the operator of the harvester, such as by the operator operating a control associated with the controller assembly.

In the illustrative embodiments, the controller assembly 70 may comprise a controller 72, and the controller may include or incorporate logic to operate the display 60 based upon factors, such as the spout position signaled by the positon sensing assembly 52. The controller 72 may include a processor 74 and memory 76 in communication with the processor. In some implementations, the controller assembly 70 may further include operator controls 78 configured to be operated by the operator of the harvester, and the controls may be in communication with the controller. Various controls 78 may be suitably utilized including, for example, adjustment of the brightness of illumination of the light sources, adjustment of the extents of the groups of light sources, etc. In other implementations, controls may be omitted from the assembly 70. Further, a housing 80 may form a portion of the controller assembly 70 and may be configured to be positioned in a suitable location on the harvester, such as in the cab of the harvester. The controls 78 may be mounted on the housing, and the controller 72 may be mounted on the housing.

While communication of signals between the controller assembly 70 and the pacing indication assembly 60 (e.g., the display signal) may be conducted over hard wiring, optionally communication between the assemblies may be conducted wirelessly via a transmitter 82 of the controller assembly 70 and a receiver 84 of the pacing indication display 60 unit (see, for example, FIG. 7). With a wireless connection between the controller assembly 70 and the indication assembly 60, the display 60 may optionally be positioned on the material transport vehicle 40 and move with the vehicle, and may be located in the view of the driver to perceive the indication. As a further option, other elements of the system may communicate wirelessly, and, for example, the position sensing assembly 52 may include a wireless transmitter and the controller assembly may include a wireless receiver to permit wireless transmission of the position signal from the position sensor to the controller assembly.

In operation, utilizing elements of the system 10, and in particular the driver pacing information apparatus 50, the operator of the harvester may utilize the positioning of the transfer spout relative to the harvester to indicate to the driver of the transport vehicle 40 the relative positioning of the vehicle 40 with respect to the harvester that is suitable or desired by the harvester operator.

Figure 8:
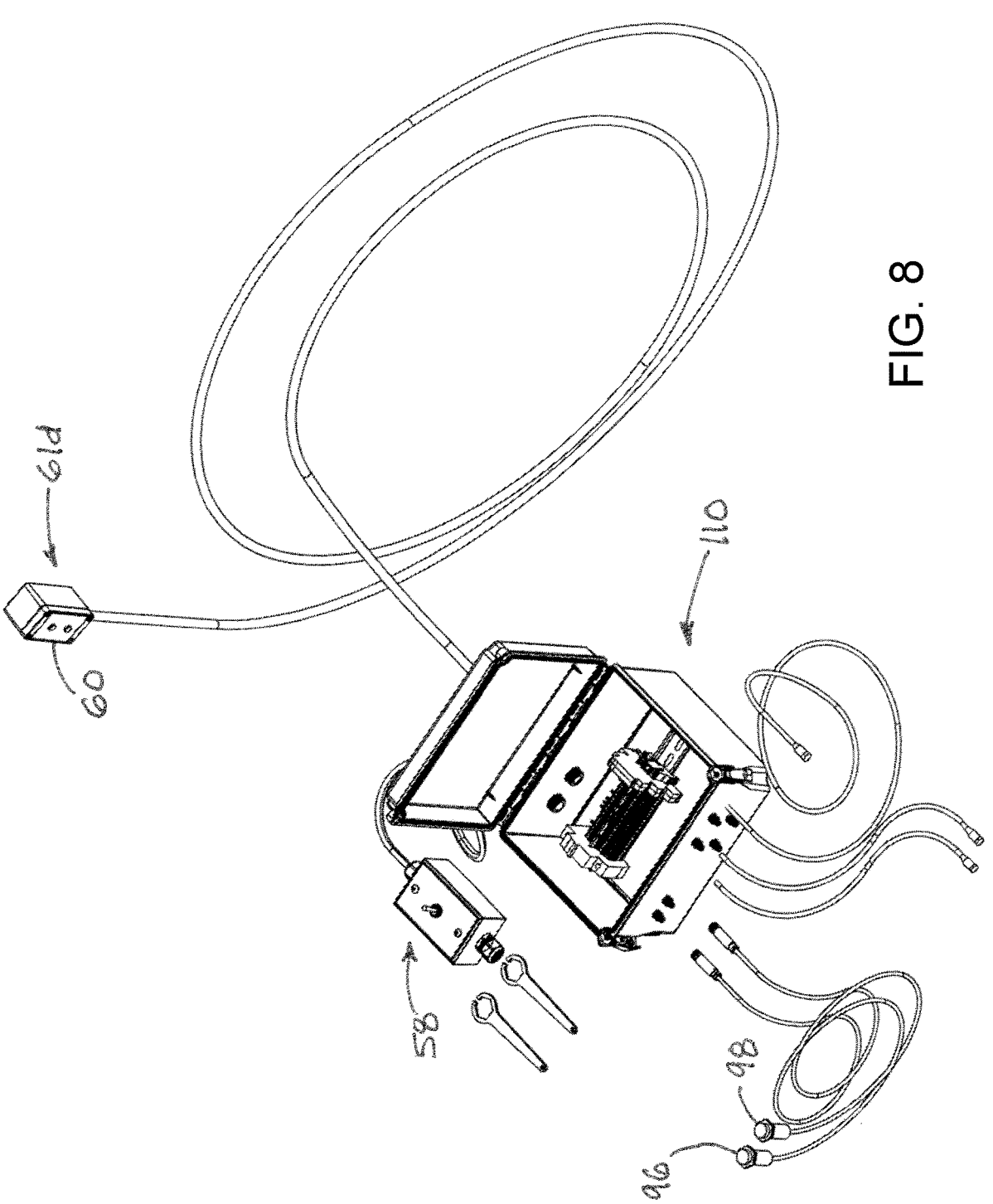
FIG. 8 is a schematic perspective view of elements of an illustrative embodiment of the driver pacing information apparatus shown isolated from the harvester.

An illustrative embodiment of elements the driver pacing information apparatus are shown in FIGS. 8 through 12, and will be described in greater detail. FIG. 8 shows elements of the apparatus isolated from a harvester, including a unit 110 for interfacing with elements of the system, such as the pacing indication display 60 and sensors 96, 98 of the position sensor mechanism. Optionally, the unit 110 may also be interfaced with a switch functioning as the operator input device 58.

Figure 9:
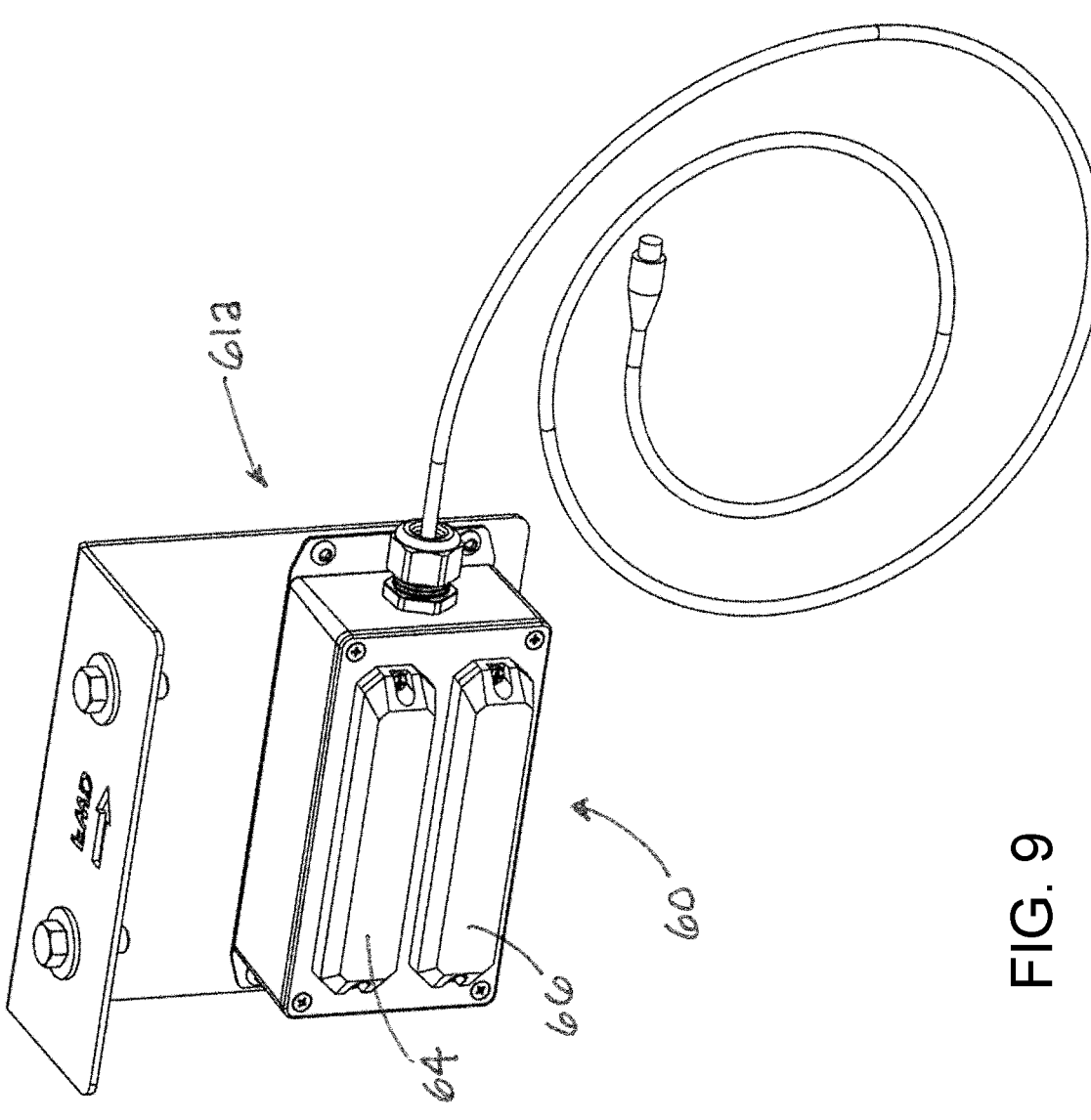
FIG. 9 is a schematic perspective view of an illustrative embodiment of a pacing indication display for mounting on the transfer spout of the harvester.

FIG. 9 shows an illustrative embodiment of a pacing indication display 60 which is highly suitable for mounting on the harvester in a location such as the first location 61a on the transfer spout 35 of the harvester. The embodiment of FIG. 9 shows a bracket which is suitable for mounting on the transfer spout 35, and may be more specifically mounted on an underside of the spout, such as by using fasteners, so that the indication display 60 is positioned below the spout. Optionally, other brackets or mounting hardware providing other positioning of the display 60 with respect to the transfer spout may be utilized.

Figure 10:
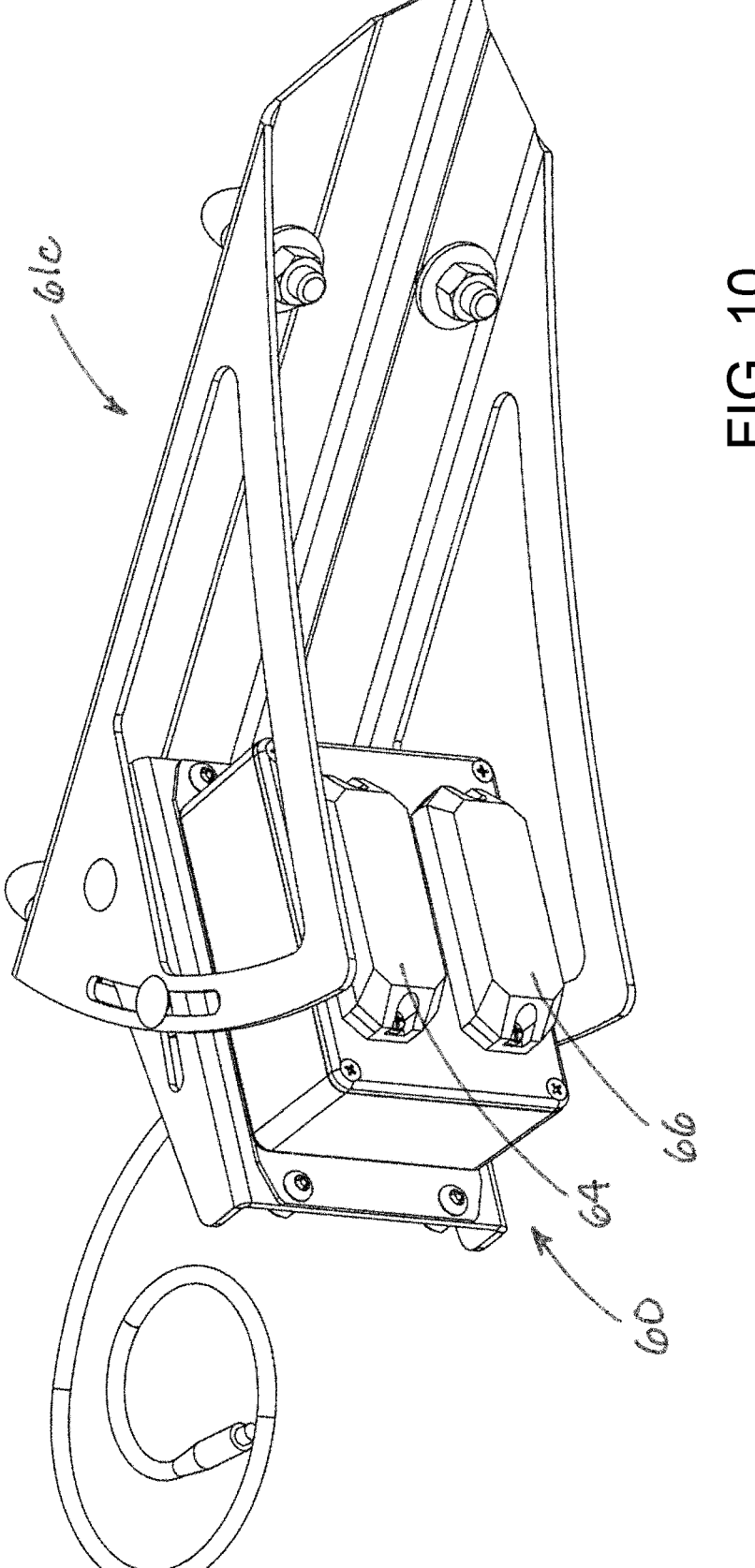
FIG. 10 is a schematic perspective view of an illustrative embodiment of a pacing indication display for mounting on the harvester head of the harvester.

FIG. 10 shows an illustrative embodiment of a pacing indication display 60 which is highly suitable for mounting on the harvester in a location such as the third location 61c on the harvester head 30 of the harvester. The embodiment of FIG. 10 shows a bracket which is suitable for mounting on the head 30, and permits adjustability in the orientation and the positioning of the indication display 60 with respect to the head. Optionally, other brackets or mounting hardware may be utilized which provide other positioning of the display 60 with respect to the head 30.

Figure 11:
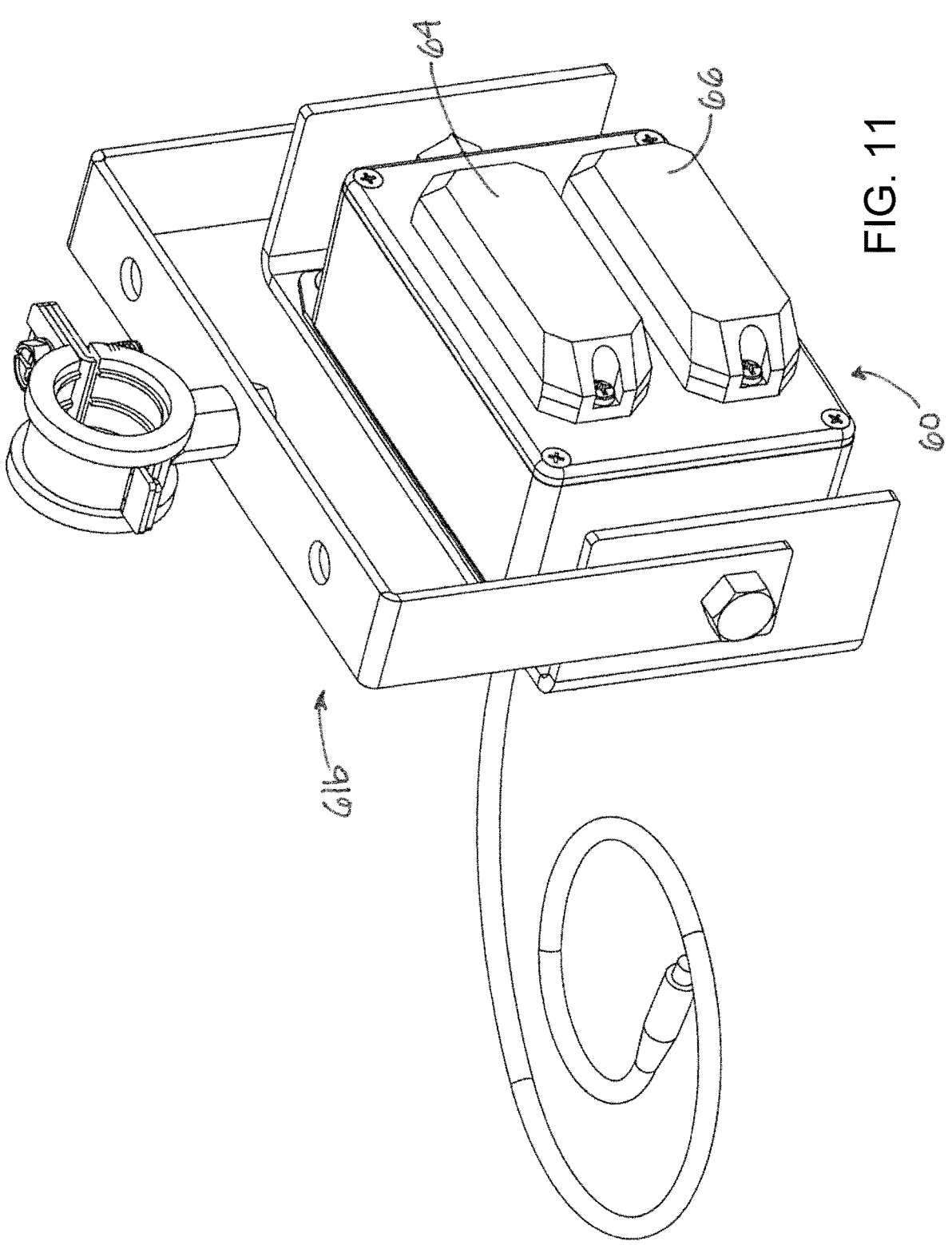
FIG. 11 is a schematic perspective view of an illustrative embodiment of a pacing indication display for mounting in a position adjacent to the operator cab, such as on a handrail of the harvester.

FIG. 11 shows an illustrative embodiment of the pacing indication display 60 which is highly suitable for mounting on the harvester in a location such as the second location 61b adjacent to the operator cab, such as on a handrail 23 of the harvester. The embodiment of FIG. 11 shows a bracket which is suitable for mounting on the handrail, although other brackets or mounting hardware may be utilized.

Figure 12:
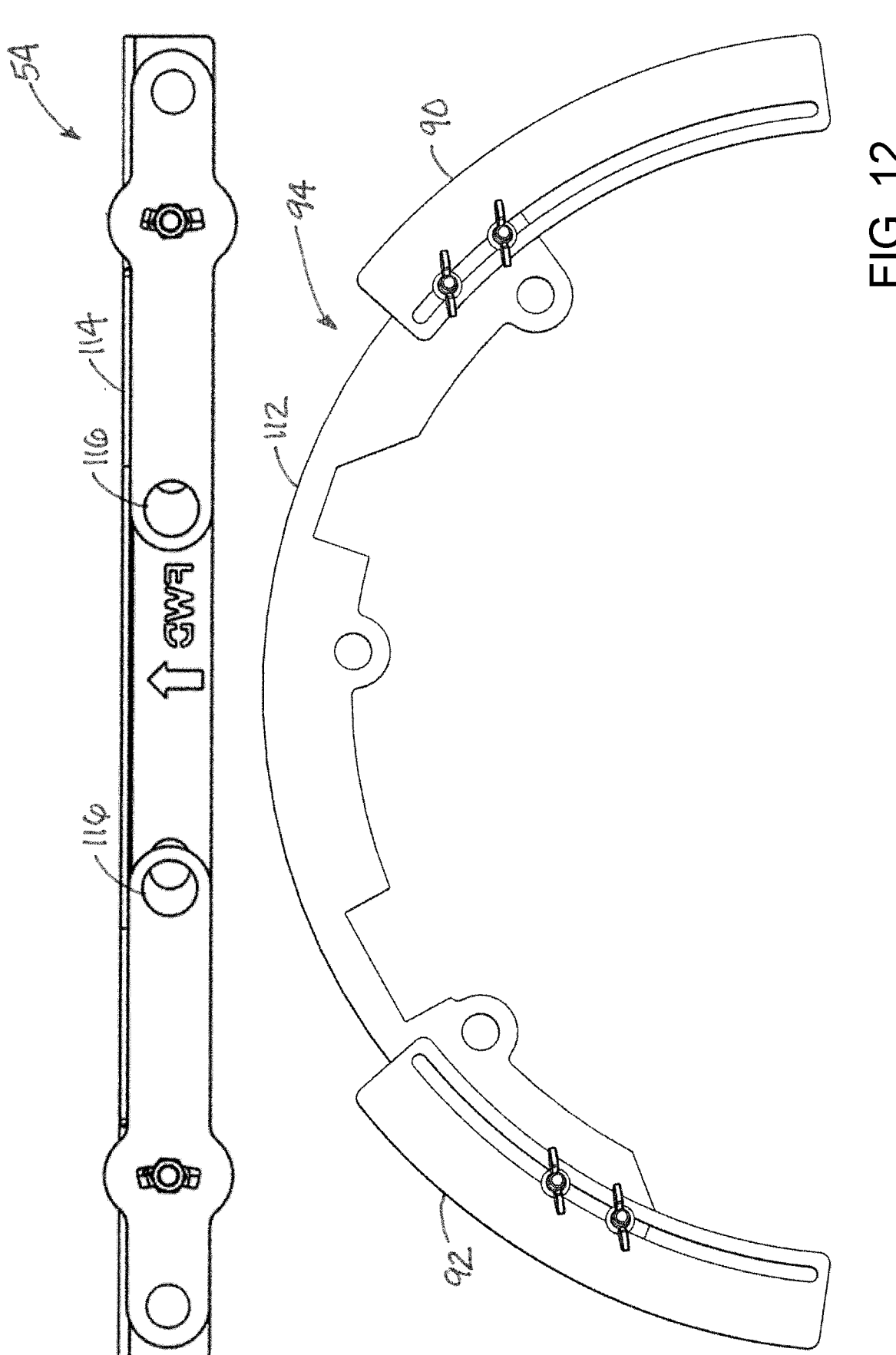
FIG. 12 is a schematic perspective view of an illustrative embodiment of mounting hardware for mounting at least one sensor on the harvester and also a rotation element for mounting on the base rotation structure of the transfer spout assembly of the harvester to move with the transfer spout.

FIG. 12 shows an illustrative embodiment of elements of the position sensing assembly 52, and more specifically elements of the position sensor mechanism 54 which may be mounted on the frame 20 of the harvester to support one or more positions sensors 96, 98, and which may be mounted on the base rotation structure 38 of the transfer spout. In the illustrative embodiments, the first 90 and second 92 rotation elements are mounted on a support frame 112 which is in turn mounted on the base rotation structure 38, and the position of one or more the rotation elements 90, 92 on the support frame may be adjustable in order to adjust the ranges corresponding to the rotational orientation of the spout 35 with respect to the harvester frame 20. Illustratively, fasteners may be provided which permit sliding adjustment of the position of the rotation elements with respect to support frame, and also the base rotation structure 38. Further, a secondary support frame 114 of the position sensor mechanism 54 may be mounted on the frame 20 adjacent to the position of the support frame 112 and the rotation elements 90, 92, and may be provided with apertures 116 for receiving the sensor or sensors 96, 98 to support the sensors in adjacent relationship to the elements 90, 92 or the gap 94.

It should be appreciated that in the foregoing description and appended claims, that the terms "substantially" and "approximately," when used to modify another term, mean "for the most part" or "being largely but not wholly or completely that which is specified" by the modified term, and may be further quantified as values or qualities which deviate approximately 10 percent or less from the value or quality or relationship stated in the disclosure.

It should also be appreciated from the foregoing description that, except when mutually exclusive, the features of the various embodiments described herein may be combined with features of other embodiments as desired while remaining within the intended scope of the disclosure.

Further, those skilled in the art will appreciate that steps set forth in the description and/or shown in the drawing figures may be altered in a variety of ways. For example, the order of the steps may be rearranged, substeps may be performed in parallel, shown steps may be omitted, or other steps may be included, etc.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

We claim:

1. A system comprising:
a mobile machine configured to move across a ground surface and gather a material from a location adjacent to the ground surface and dispense the material from a dispensing structure of the machine at a raised location with respect to the ground surface, the dispensing structure being movable to change a trajectory of material exiting the dispensing structure; and
a driver pacing information apparatus configured to provide a driver of a transport vehicle with pacing information for operating the transport vehicle alongside the mobile machine;
wherein the dispensing structure of the mobile machine includes a transfer spout assembly with a transfer spout; and
wherein the driver pacing information apparatus comprises:
a position sensing assembly for sensing a position of the transfer spout with respect to the frame of the harvester; and
a pacing indication display configured to provide pacing information in a sensibly-perceptible form to the driver of the transport vehicle moving along a path oriented substantially parallel to a path of the mobile machine;
wherein the position sensing assembly comprises a position sensor in communication with the transfer spout to sense an angular value of the position of the transfer spout, the position sensor being configured to detect a first range of angular values and a second range of angular values, the first range of angular values being associated with an orientation of the spout for which a decrease in a speed of movement of the transport vehicle is indicated and the second range of angular values being associated with an orientation of the spout for which an increase in the speed of movement of the transport vehicle is indicated.

2. The system of claim 1 wherein the pacing indication display has a plurality of display modes;
wherein a first one of the display modes of the display corresponds to sensing by the position sensor of an angular value of the position of the transfer spout in the first range of angular values;
wherein a second one of the display modes of the display corresponds to sensing by the position sensor of an angular value of the position of the transfer spout in the second range of angular values; and
wherein the first display mode and the second display mode are visually distinguishable from each other.

3. The system of claim 2 wherein the position sensor is configured to detect a third range of angular values associated with an orientation of the transfer spout for which maintenance of a current speed of movement of the transport vehicle is indicated; and
wherein a third one of the display modes of the pacing indication display corresponds to sensing by the position sensor of an angular value of the position of the transfer spout in the third range of angular values; and
wherein the third display mode is visually distinguishable from the first display mode and the second display mode.

4. The system of claim 3 wherein the third range of angular values comprises orientations of the transfer spout between the first range of angular values and the second range of angular values.

5. The system of claim 2 wherein the pacing indication display includes a plurality of light sources including:
at least one first light source illuminated during the first display mode of the display; and
at least one second light source illuminated during the second display mode.

6. The system of claim 5 wherein the at least one first light source has a first color and the at least one second light source has a second color, the first and second colors being different.

7. The system of claim 1 wherein the mobile machine comprises a harvester.

8. The system of claim 1 wherein the pacing indication display is configured to provide pacing information visually and the pacing indication display is positioned in a visually apparent location on the harvester.

9. The system of claim 1 wherein the driver pacing information apparatus includes a plurality of the pacing indication displays.

10. A driver pacing information apparatus for providing a driver of transport vehicle with pacing information for operating the transport vehicle alongside a mobile machine, the pacing information apparatus comprising:

a position sensing assembly configured to sense a position of a transfer spout of the mobile machine with respect to a frame of the mobile machine;

a pacing indication display configured to provide pacing information to the driver of the transport vehicle;

a controller assembly configured to control the pacing indication display based upon position sensing of the position sensing assembly;

wherein the position sensing assembly comprises a position sensor configured to sense an angular value of the position of the transfer spout, the position sensor being configured to detect a first range of angular values and a second range of angular values, the first range of angular values being associated with an orientation of the spout for which a decrease in a speed of movement of the transport vehicle is indicated and the second range of angular values being associated with an orientation of the spout for which an increase in the speed of movement of the transport vehicle is indicated.

11. The apparatus of claim 10 wherein the pacing indication display is configured to visually provide pacing information to the driver of the transport vehicle.

12. The apparatus of claim 10 wherein the position sensor is configured to be mounted on a frame of the mobile machine to sense a rotational position of the transfer spout of the mobile machine.

13. The apparatus of claim 10 wherein the pacing indication display has a plurality of display modes;

wherein a first one of the display modes of the display corresponds to sensing by the position sensor of an angular value of the position of the transfer spout in the first range of angular values;

wherein a second one of the display modes of the display corresponds to sensing by the position sensor of an angular value of the position of the transfer spout in the second range of angular values; and wherein the first display mode and the second display mode are visually distinguishable from each other.

14. The apparatus of claim 13 wherein the pacing indication display includes a plurality of light sources including:

at least one first light source illuminated during the first display mode of the display; and at least one second light source illuminated during the second display mode.

15. The apparatus of claim 14 wherein the at least one first light source has a first color and the at least one second light source has a second color, the first and second colors being different.

16. The apparatus of claim 13 wherein the position sensor is configured to detect a third range of angular values associated with an orientation of the transfer spout for which maintenance of a current speed of movement of the transport vehicle is indicated; and wherein a third one of the display modes of the pacing indication display corresponds to sensing by the position sensor of an angular value of the position of the transfer spout in the third range of angular values; and wherein the third display mode is visually distinguishable from the first display mode and the second display mode.

17. The apparatus of claim 16 wherein the third range of angular values comprises orientations of the transfer spout between the first range of angular values and the second range of angular values.

* * * * *